No. 788,312. PATENTED APR. 25, 1905.
J. L. GREATSINGER.
FILTER.
APPLICATION FILED JUNE 14, 1904.

2 SHEETS—SHEET 1.

WITNESSES:
M. E. Verbeck.

INVENTOR
Jacob L. Greatsinger
BY
Eugene Diven
ATTORNEY

No. 788,312. PATENTED APR. 25, 1905.
J. L. GREATSINGER.
FILTER.
APPLICATION FILED JUNE 14, 1904.

2 SHEETS—SHEET 2.

WITNESSES:
M. E. Verbeck
A. D. Diven

INVENTOR
Jacob L. Greatsinger
BY
Eugene Diven
ATTORNEY

No. 788,312. Patented April 25, 1905.

UNITED STATES PATENT OFFICE.

JACOB L. GREATSINGER, OF BROOKLYN, NEW YORK.

FILTER.

SPECIFICATION forming part of Letters Patent No. 788,312, dated April 25, 1905.

Application filed June 14, 1904. Serial No. 212,491.

*To all whom it may concern:*

Be it known that I, JACOB L. GREATSINGER, a citizen of the United States, residing at Brooklyn, in the county of Kings and State of New York, have invented certain new and useful Improvements in Filters, of which the following is a specification.

My invention relates to improvements in water-filters, and has to do more particularly with filters intended for the clarification of the feed-water for steam-power plants in which the exhaust-steam after condensation and collection in the hot-wells is to be returned to the boilers for reëvaporation. The water coming from the hot-wells is charged to a greater or less extent with lubricating-oil and other impurities; and it is my purpose to provide a continuous system of filtration for this oil-impregnated water whereby the oil and other impurities will be effectually removed from the water and in which the filtration will be conducted upon such a scale that the water from the condensers in large power plants will be conducted to and through the filters and back to the boilers in a continuous and adequate flow, thereby providing for a cycle of evaporation, condensation, and clarification, whereby the water passing through the boilers will be used over and over again, with the addition only from time to time of such an amount of water as will be required to make up for necessary and unavoidable loss and wastage.

A further object is to provide a sectional filter in which each section as it becomes clogged with impurities will be removed for cleansing and a section filled with a fresh filtering medium inserted, these changes being made without interrupting the passage of the water through the remaining sections.

Other novel features pertaining to my invention will be described and pointed out more particularly hereinafter.

I attain my object by means of the arrangement and construction of the several parts of my improved filtering system, as illustrated in the accompanying drawings, in which—

Figure 1:
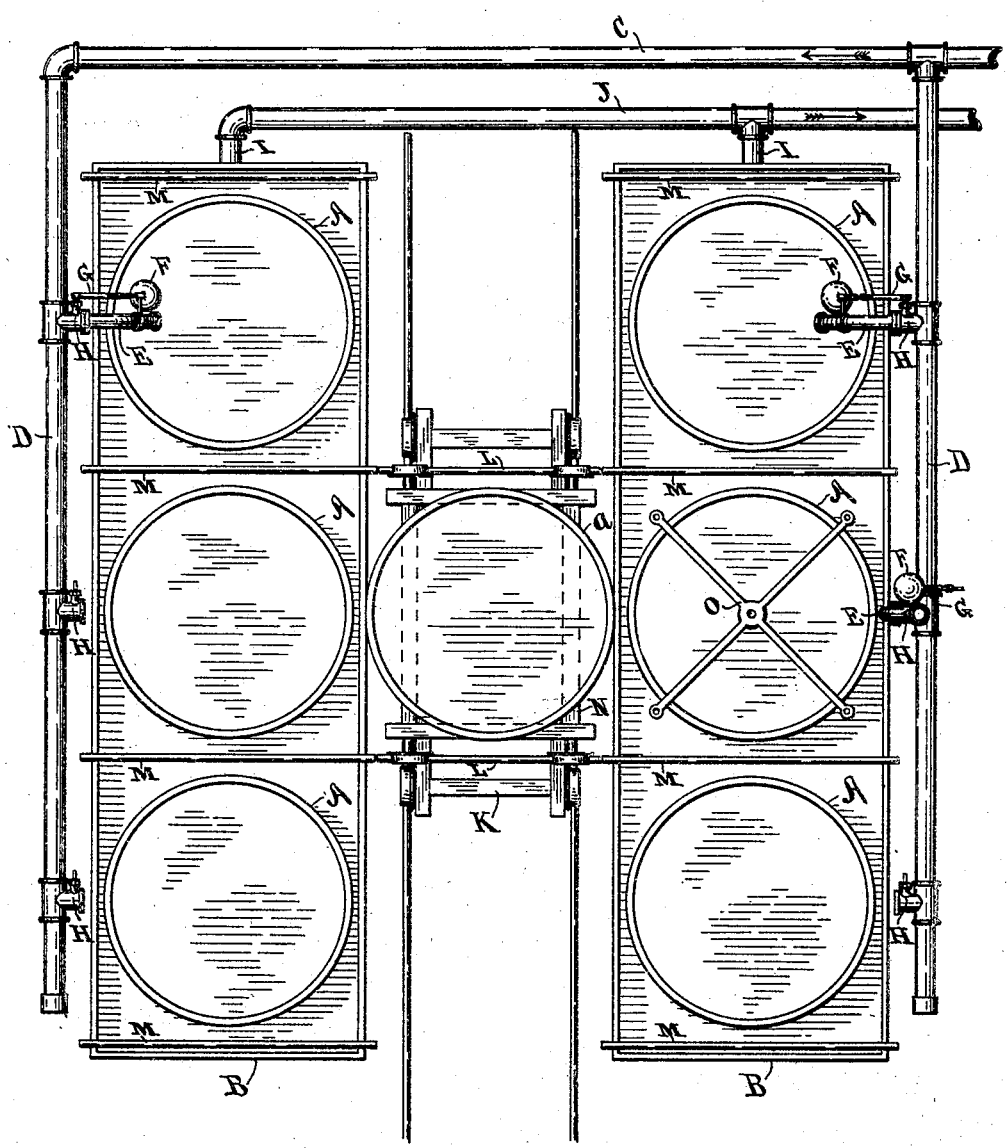
Figure 2:
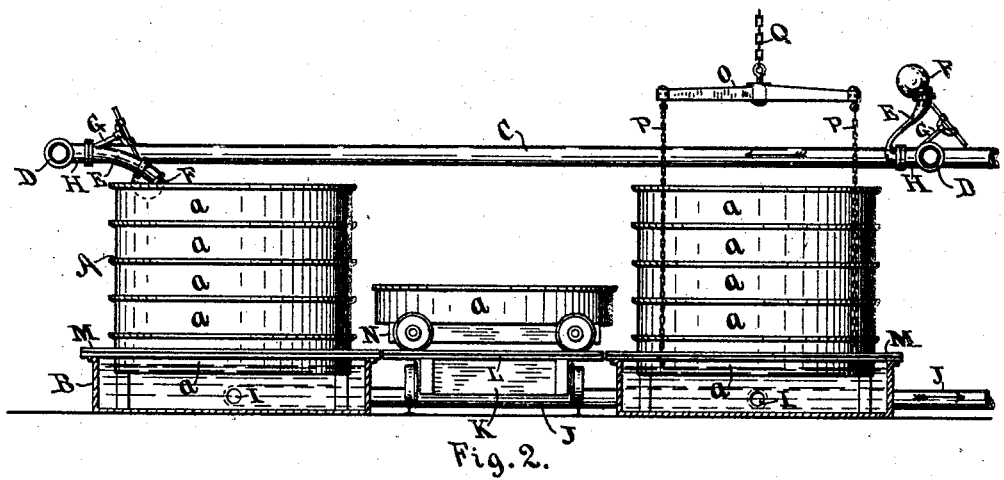
Figure 3:
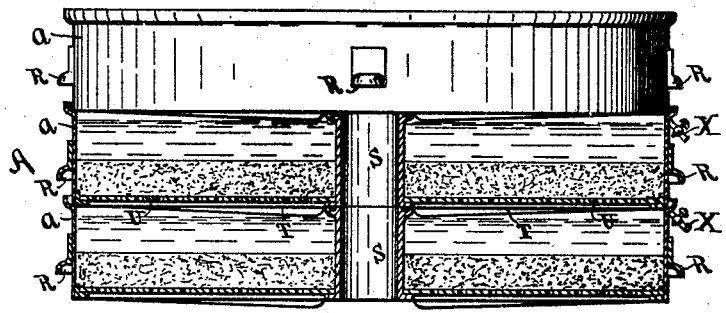
Figure 4:
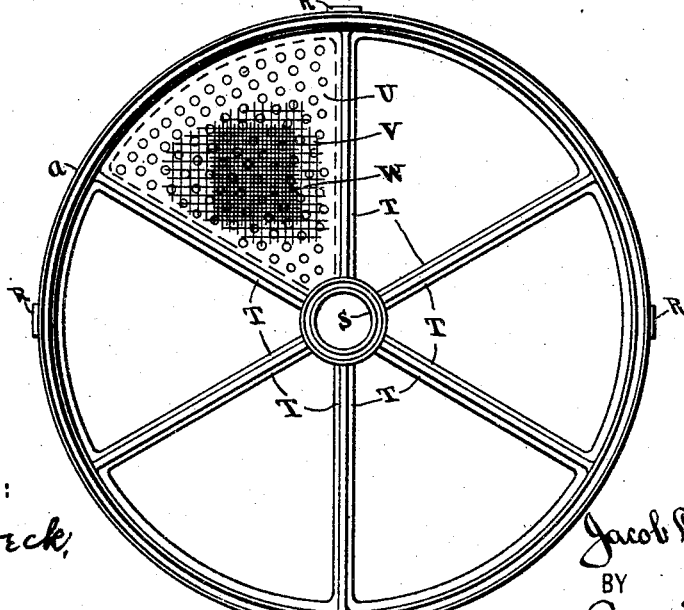

Figure 1 represents a plan view of a complete filtering plant embodying my improvements; Fig. 2, an end elevation of the same, the receiving-tanks for the purified water being shown in cross-section; Fig. 3, a stack of filter-sections on an enlarged scale, two of said sections being shown in vertical transverse section; and Fig. 4, a plan view of a filter-section with portions of the filtering materials removed.

Like letters of reference designate like parts in the several views.

A filtering plant comprising my improvements will be made up of a battery or batteries comprising a number of separate filter-stacks arranged in rows, according to the space that can be utilized for the purpose and the quantity of water to be filtered. In Fig. 1 I have represented the filter-batteries arranged in two parallel rows containing three filter-stacks A in each row by way of illustration, and it will be evident that a greater or less number of individual filter-stacks may be placed in each row or battery. The filter-stacks A are supported over comparatively shallow open or closed tanks B, which extend continuously from one end of a series of filters to the other and in which the clarified water from the filters is collected. The water from the source of supply—that is, from the hot well or wells in a steam-power plant—is conducted through the pipes C and D to offsets above each filter-stack. From these offsets spouts E conduct the water into the top of the filters. These spouts I preferably make of flexible hose, the ends of the spouts being supported above the filters by means of floats F. These floats are attached to levers G, by which the valves H in the offsets from pipes D are controlled. As the water flows into the filters and rises above the filter-beds therein the floats F will be lifted, thereby actuating the valves H, and when the water rises to the point of overflowing the floats will have entirely closed the valves and shut off the flow. When the filter-sections are to be changed for renewing the filter-beds, the spouts E will be thrown back into the position shown at the right hand in Figs. 1 and 2. From the tanks B the water is drawn off, by means of the boiler feed-pumps, through the outlets I I and pipe J.

The individual filter-stacks A are each made up of a number of sections $a$, each section constituting a complete filter in itself. My preferred construction of these sections is illustrated more fully in Figs. 3 and 4. Each section is made up of a cylindrical shell of metal, at the bottom of which is a spider T, the members of which radiate from a central hollow hub S. Upon the arms of the spider rest perforated plates U, and resting on these perforated plates is, first, a wire-netting V, above that a layer of cheese-cloth W, and resting upon the cheese-cloth a stratum of filtering material of about half the depth of the section. This filter-bed may be of any desirable materials, dependent upon the character of the water to be filtered. For filtering oil-impregnated water I preferably use for this filter-bed a silico-carbon material, such as is described in Letters Patent to J. R. Reed, No. 644,637, dated March 6, 1900. Each filter-section is provided with a flaring rim at the top, in which the bottom of the superposed section rests, and for the purpose of removing and changing the sections each one is provided around the sides with a plurality of lugs R, into which may be hooked the ends of a chain tackle O P Q, which is hung from an overhead traveling crane.

Between the filter-batteries is a track upon which runs a truck K, upon the top of which are laid tracks L, corresponding with tracks M, which are laid across the tanks B at each side of the filters A. Upon the tracks L is a second truck N, adapted to carry a filter-section to and from the filter-stacks.

In operation the water is run into the top section of each filter-stack through the spouts E, whence it percolates through the filter-bed therein down into the next lower section, passing thence through the filter-bed in that section into the section below, and thence through all the sections into the receiving-tank B. When the filter-bed in the top section of one of the stacks has become so fouled and clogged as to prevent the further passage of water therethrough, the flow will be shut off by the rising of the float F, after which the attendants will remove this fouled section and insert a fresh section, the latter section being inserted at the bottom of the stack, or instead of removing the top section as soon as the flow becomes interrupted a layer of the fouled filter-bed—say an inch or so—may be scraped away from the top from time to time until the section is about emptied of its bed, after which the entire section will be removed. To accomplish this change, the spout E will first be thrown back out of the way, as already described, and the tackle O P Q will be brought into position, as shown more clearly at the right hand in Fig. 2. This tackle will be hooked to the lowermost section of the stack and the entire stack raised sufficiently to permit a fresh section which has been brought into the filter-room upon trucks K and N to be run in underneath the stack. When this fresh section is in position, the stack will be lowered and the tackle hooked to the fresh section. The stack will again be raised and the truck N run out into place upon truck K. The stack will then be again lowered into position, after which the upper section will be removed and placed upon truck N, upon which it will be run out to the cleansing-room to have the fouled bed removed and a fresh bed inserted. While the filter-stack is being raised and lowered to accomplish these changes of sections the water in the remaining sections will continue to flow, and as soon as the fouled section has been removed the spout E will be thrown back into place and the flow from the supply-pipe D again established. As very little time is consumed in making these changes of sections, the flow of water through the filter-stacks will be practically uninterrupted, and it will be apparent that the supply of clarified water to the tanks B will be practically constant. As it will require a certain period of time for a given quantity of water to pass through each filter-stack, it remains simply to provide enough of these stacks to take care of the water as fast as it accumulates in the hot-wells and to pass it back to the boilers in an uninterrupted flow.

The joints between the filter-sections may be made water-tight by suitable packing-gaskets, and the air entrapped between the sections may be vented by suitable air cocks or valves, as indicated at X in Fig. 3, located near the top of the sections, as the water flows downward from section to section. By venting the air-spaces between the sections, completely filling the stack of filter-sections with water, and afterward starting the flow from the lower section a partial vacuum may be formed between sections, which will aid in drawing the water through the filter-beds. When the water to be filtered contains much oil, however, the flow through the top section, where most of the oil is caught, will be comparatively slow, while through the lower sections it will be faster, and therefore where this is the case the joints between sections need not be made water-tight and the air can be freely vented, since there will be no danger of flooding any of the sections as the water flows through them. As each upper section of the stack becomes fouled it is removed in the manner above described and carried away to another part of the plant, where the filter-bed is treated to a revivifying process, whereby the cylinder-oil is recovered and the filter-bed so cleansed as to be used over again, the revivified material being replaced in the filter-sections and returned to the filter-batteries as fast as the fouling of the sections may require. A process for revivifying these filter-beds and recovering the cylinder-oil is described in a copending application of David W. Payne, Serial No. 212,486, filed June 14, 1904.

While my improved system of filtration is adapted and intended more particularly for use in clarifying the exhaust-water from steam-power plants, it may also be used to advantage in the filtration of water in connection with waterworks and also for the filtration of other liquids, and I therefore do not restrict myself to any specific use for my system. Moreover, the individual sections which go to make up a filter-stack may be arranged and constructed in various ways without departing from the spirit of my invention.

Having thus described my improvements, what I claim as my invention, and desire to secure by Letters Patent, is—

1. A filter comprising a plurality of filter-sections through which, consecutively, the liquid to be filtered is passed, means for removing said sections from the intake end as they become fouled, means for moving forward the remaining sections, and means for inserting fresh sections at the outlet end.

2. A filter comprising a plurality of filter-sections stacked one upon another, means for delivering the liquid to be filtered to the top section, means for drawing off the clarified liquid as it passes from the bottom section, and means for raising and lowering the entire stack and the individual sections thereof, whereby the top sections as they become fouled may be removed and fresh sections inserted at the bottom of the stack.

3. A filter system comprising a plurality of filter-stacks, each stack consisting of a plurality of individual filter-sections, means for delivering the liquid to be filtered to the top of each filter-stack, means for drawing off the clarified liquid from the bottom of all the stacks, and means for raising and lowering each stack in its place and effecting changes in the individual sections, whereby fouled sections may be removed from the top and fresh sections inserted at the bottom.

4. A filter system comprising a plurality of filter-stacks set in a row, each stack consisting of a plurality of individual filter-sections, means for delivering the liquid to be filtered to the top of each stack, means for drawing off the clarified liquid from all the stacks, a track running parallel with the row of stacks, transverse tracks at the foot of each stack, a truck on the main track carrying transverse tracks corresponding to the tracks at the foot of the stacks, a second truck mounted upon the first-named truck, and means for raising and lowering the stacks, whereby the filter-sections may be changed, substantially as and for the purpose set forth.

5. A filter system comprising a plurality of filter-stacks set in a row, each stack consisting of a plurality of individual filter-sections, means for delivering the liquid to be filtered to the top of each stack, a receiving-tank for the clarified liquid below the stacks, a track running along by the side of said tank, transverse tracks laid across the tank at the foot of each stack, a truck on the main track carrying transverse tracks corresponding to the tracks across the tank, a second truck mounted upon the first-named truck, and means for raising and lowering the stacks and the individual sections, whereby said sections may be changed, substantially as and for the purpose set forth.

6. A filter system comprising a plurality of open gravity-filter stacks positioned over a common receiving-tank, filter-beds arranged in layers in said stacks, means for delivering the liquid to be filtered to the top of each stack, means for removing the upper portions of the filter-beds as they become fouled, and means for inserting fresh filter-beds at the bottoms of the stacks, said changes being effected without changing the positions of the stacks over the receiving-tank.

7. A built-up gravity-filter comprising a plurality of filter-beds spaced apart, means for delivering the liquid to be filtered to the top of the filter, means for drawing off the clarified liquid from the bottom of the filter, and means for removing portions of the filter-beds from time to time from the top of the filter and replacing them by fresh portions inserted at the bottom of the filter.

8. A gravity-filter comprising a stack of separable filter-sections, a supply-pipe for the liquid to be filtered positioned at one side and above said filter, a flexible spout leading from an offset from said pipe into the top of the filter, a float, a valve in the offset actuated by said float as the liquid rises in the filter, and means for throwing the spout and float away from the filter, when the filter-sections are to be changed.

9. A gravity-filter comprising a plurality of filter-sections stacked one upon another, means for delivering the liquid to be filtered to the top of the filter, means for drawing off the clarified liquid from the bottom of the filter, and means for removing fouled sections from the top of the filter and replacing them by fresh sections inserted at the bottom of the filter, said changes of sections being made without interrupting the discharge of liquid from the filter.

10. In a gravity-filter, means for removing portions of the filtering medium from the top of the filter and inserting portions of fresh filtering medium at the bottom of the filter, said changes being effected without interrupting the discharge of liquid from the filter.

In testimony whereof I have affixed my signature in presence of two witnesses.

JACOB L. GREATSINGER.

Witnesses:
DAVID W. PAYNE,
JESSE FULLER, Jr.